J. GILSON, Sr.
HAND WEEDER.
APPLICATION FILED NOV. 19, 1917.
1,366,379.
Patented Jan. 25, 1921.
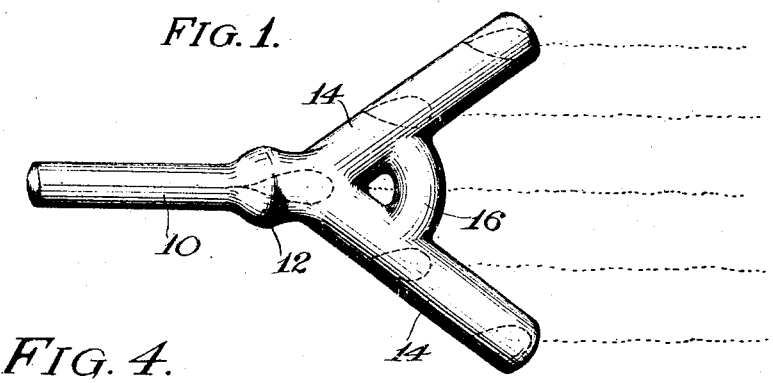
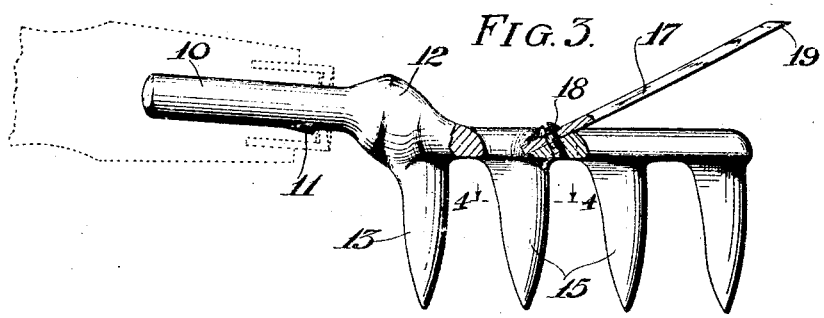
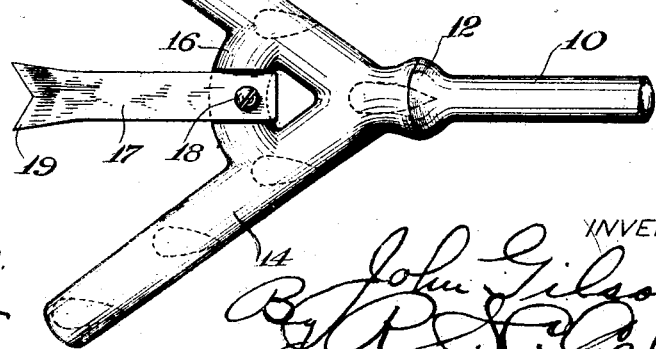

UNITED STATES PATENT OFFICE.

JOHN GILSON, SR., OF PORT WASHINGTON, WISCONSIN, ASSIGNOR TO J. E. GILSON COMPANY, OF PORT WASHINGTON, WISCONSIN, A FIRM CONSISTING OF JOHN GILSON, SR., AND JOHN E. GILSON, JR.

HAND-WEEDER.

1,366,379.   Specification of Letters Patent.   Patented Jan. 25, 1921.

Application filed November 19, 1917. Serial No. 202,724.

*To all whom it may concern:*

Be it known that I, JOHN GILSON, Sr., a citizen of the United States, and resident of Port Washington, in the county of Ozaukee and State of Wisconsin, have invented new and useful Improvements in HandWeeders, of which the following is a description, reference being had to the accompanying drawings, which are a part of this specification.

This invention has for its object to provide a tool for use in loosening the surface of the soil in green house benches and flats and in gardening operations where close work is required.

It is the object of the invention to provide a tool which will cut through the crust which forms on the surface of the soil and crumble the same close to the rows of plants without injury to the plants, leaving the soil loose and in a condition for admitting air.

Heretofore hand weeders of the type having three or more prongs for single hand use in flats and greenhouse benches have had their prongs arranged, when drawn toward the operator, as is usual with an implement of this character, to form a pocket or cage between them in which lumps of soil crust would gather and interfere with the operation, making it necessary to frequently clear the tool. With the present invention the prongs are arranged in a V-shaped formation with the apex or point of the V in advance as the tool is drawn toward the operator.

It is also an object to provide the prongs or tines of the cultivator with their front parts forming knife edges that will slice the crust of the soil.

Another object of the invention is to associate with the hand weeder of this invention a cutting blade with a V-shaped notch at it end for use in cutting weeds.

With the above and other objects in view the invention consists in the hand weeder, its parts and combinations of parts as herein claimed and all equivalents.

Referring to the accompanying drawings in which like characters of reference indicate the same parts in the different views:

Figure 1 is a plan view of a hand weeder constructed in accordance with this invention;

Fig. 2 is a similar view of a modification thereof;

Fig. 3 is a side view; and,

Fig. 4 is a sectional view on the plane of line 4—4 of Fig. 3.

In these drawings 10 indicates the stem or shank portion of the hand weeder head. This stem is preferably provided with a spur or barb 11 which, when driven through the usual ferrule at the end of the handle shown in dotted lines, will resist withdrawal and so retain the head in place. At the end of the stem or shank 10 is an enlargement 12 from which projects a downwardly directed front tooth 13 and horizontal diverging arms 14, each having a row of downwardly directed teeth 15. A brace 16 preferably connects the two arms 14 to give strength thereto.

The teeth 13 and 15 form rounded claws or tines with their front edges, in the direction of the handle, drawn to a point in cross section so as to present curving knife edges that will slice the crust of the soil as they are drawn through it. The central leading tooth 13 cuts a furrow through the crust of the soil and the succeeding teeth do the same on either side, the wedge shape of the teeth serving to give sufficient lateral crowding to the slices of soil crust to cause them to crumble. The knife edge wedge-like formation of the teeth enables the tool to be drawn through the soil without great resistance to its passage and produces a crumbling action to a maximum degree consistent with such resistance. The arrangement of the teeth in the V-shaped formation with the central tooth ahead of the others, avoids the gathering of clods as with any other arrangement and results in the tool being kept free from obstruction. The Y-shaped form of the tool, furthermore, permits the arms thereof to be placed between the stems of plants in the rows as the tool is drawn toward the operator without danger of injury to the plants, for the incline of the arms deflects the tool away from the plant stem before the teeth engage therewith. This permits the tool to be used in weeding between the plants in the row as well as between the rows of plants.

With the larger tools for out-of-door use, it is found desirable to provide a weed cutting blade and for this purpose the brace 16 is flattened and has a cutter blade 17 secured thereto by means of a screw 18, such cutter blade being in an inclined position with relation to the plane of the arms 14 and having its end provided with a V-shaped notch 19 with beveled cutting edges. By inverting the tool and pushing it toward the weed, the stem of the weed is caught in the V-shaped notch 19 of the cutting blade 17 and is severed close to, or beneath the surface of the ground.

What I claim as new and desire to secure by Letters Patent is:

1. A hand weeder, comprising a stem, a barb or spur projecting from the stem, an enlargement on the end of the stem, diverging arms projecting from the enlargement, and downwardly projecting teeth on the arms.

2. A hand weeder comprising a stem portion with diverging arms, rows of teeth projecting from the arms, and an upwardly extending inclined cutting blade positioned between the arms.

3. A hand weeder, comprising a stem portion having diverging arms, a brace connecting the arms, rows of teeth projecting from the arms, and an inclined blade secured to the brace and having a V-shaped cutting edge at its end.

In testimony whereof I affix my signature in presence of two witnesses.

JOHN GILSON, Sr.

Witnesses:
G. H. ADAM,
JULIA M. MARTIN.